April 18, 1967   A. F. LUTZ   3,315,163
METER PROBE WITH SLIDABLE CIRCUIT CHANGING CONTACT POINT
Filed April 2, 1963   2 Sheets-Sheet 1

INVENTOR
Albert F. Lutz
his attorneys

April 18, 1967  A. F. LUTZ  3,315,163
METER PROBE WITH SLIDABLE CIRCUIT CHANGING CONTACT POINT
Filed April 2, 1963  2 Sheets-Sheet 2

INVENTOR
Albert F. Lutz
By Hoopes, Leonard & Buell
his Attorneys

United States Patent Office 3,315,163
Patented Apr. 18, 1967

3,315,163
METER PROBE WITH SLIDABLE CIRCUIT CHANGING CONTACT POINT
Albert F. Lutz, 5 Harrison St.,
Pittsburgh, Pa. 15205
Filed Apr. 2, 1963, Ser. No. 269,932
6 Claims. (Cl. 324—149)

This invention relates to a probe for electrical testing, particularly for testing electrical characteristics of electrical circuits such as voltage, electrical resistance (ohmage) and current (milliamperes). My probe is of the general type of probes used by electronic technicians for example in servicing and repairing radio and television receiving sets and other electronic equipment but has new features giving it important advantages over previously available probes.

Probes of the type above mentioned as known prior to my invention comprised a contact element constituting one terminal of the probe, a conductor constituting the other terminal of the probe and a meter in electrical circuit with the terminals. The meter was sometimes provided with variable resistance means controllable by the operator through switch means on the meter.

Servicing and repair jobs on electronic equipment involve determination of electrical characteristics of electrical circuits being tested, which electrical characteristics may vary widely from job to job or even in the same job. For example, the voltage of circuits being tested may vary from a few volts to hundreds of volts. If prior to my invention a voltmeter having a full scale reading of, say, 150 volts was being used and it developed that a substantially higher voltage had to be measured, either a different voltmeter had to be substituted or, if the voltmeter was of the type provided with variable resistance means controllable by the operator, the operator had to divert his attention from the probe to operate the switch means on the meter to activate the proper resistance so that the voltage could be read on the voltmeter scale.

On the other hand, if prior to my invention a voltmeter having a full scale reading of 150 volts was being used and it developed that a relatively very small voltage, say of the order of 4 or 5 volts, had to be measured, again either a different voltmeter had to be substituted or, if the voltmeter was of the type provided with variable resistance means controllable by the operator, the operator had to divert his attention from the probe to operate the switch means on the meter to activate the proper resistance so that the voltage could be read with sufficient accuracy on the voltmeter scale. Voltages of the order of 4 or 5 volts cannot be read with accuracy on a voltmeter having a full scale reading of 150 volts. Readings of optimum accuracy are obtained in the upper reaches of the meter scale.

I have obviated the above mentioned disadvantages of probes for electrical testing and have provided an improved probe which greatly facilitates the tester's work and improves testing efficiency. The tester, technician or service man at no time has to divert his attention from the probe to change meters or to opearte switch means on the meter. The probe itself is provided with means whereby, without changing meters or operating switch means on the meter, voltages over an unprecedentedly wide range may be measured; also my probe may be employed without changing leads for measuring characteristics of circuits of both normal and reverse polarities, for measuring resistance or ohmage in a circiut impressed with a known voltage originating in the test equipment, for measuring current or milliamperes in a circuit impressed with a known voltage originating in the circuit of the electronic device being tested and for measuring alternating current voltage when the current is suitably rectified.

I provide a probe for electrical testing which comprises a casing, preferably adapted to be held in the hand, a contact element constituting one terminal of the probe mounted in and projecting from the casing, a conductor constituting the other terminal of the probe extending from the casing and a meter in electrical circuit with said terminals, the contact element being shiftable selectively to a plurality of positions relatively to the casing, the probe having different eelctrical connections through the contact element, the other terminal and the meter in the respective positions of the contact element relatively to the casing for testing differing electrical characteristics of electrical circuits extraneous to the probe circuit. The casing is preferably elongated and the contact element is preferably also elongated and mounted in the casing with its longitudinal dimension lengthwise of the casing and projecting from an end of the casing. The conductor constituting the other terminal of the probe preferably extends from the casing at a location remote from the end of the casing from which the elongated contact element projects. The elongated contact element is preferably shiftable lengthwise of the casing selectively to said various positions. The electrical connections of the probe preferably include resistance elements of different magnitudes or polarity reversing means or, desirably, both such resistance elements of different magnitudes and polarity reversing means.

Two conductors preferably extend from the casing to the meter whereby the meter is in electrical circuit with the terminals of the probe. Those two conductors and a conductor constituting a terminal of the probe, while insulated from one another, preferably extend from the casing as a composite cable (three conductors in a single sheath) facilitating use of the probe in testing.

In a present preferred form my probe comprises a contact element constituting one terminal of the probe mounted in and projecting from the casing together with a conductor constituting the other terminal of the probe extending from the casing, a meter in electrical circuit with the terminals of the probe and spring means urging the contact element to projected position, the contact element being shiftable inwardly of the casing to selected positions relatively thereto by holding the casing with the contact element in contact with an element of an electrical circuit being tested and pressing the casing toward said element of the electrical circuit being tested causing the casing to advance over the contact element against the action of the spring means while the contact element remains substantially stationary, the probe having different electrical connections through the contact element, the other terminal and the meter in the respective positions of the contact element relatively to the casing for testing differing electrical characteristics of electrical circuits extraneous to the probe circuit. Indicating means are preferably provided which are connected with the contact element indicating outwardly of the casing at all times the position of the contact element relatively to the casing.

Although I prefer to utilize spring means acting against the contact element as I have described I may dispense with the spring means and provide for moving the contact element to a selected one of a plurality of positions in which the contact element remains until it is moved to another position. While I prefer to move the contact element longitudinally to said respective positions the connections may be such that instead of being moved longitudinally the contact element may be rotated to said respective positions. In any event, the changes in circuitry required to adapt the probe to different conditions are effected entirely within the probe itself and the necessity of changing meters or operating switch means on the meter is done away with. Of course if a meter provided, for example, with different selectively usable resistance units is being employed the meter may be set at the beginning of testing for the optimum circuitry. Normally it will not be necessary to reset the meter, although if the probe is to be used for testing an entirely different category of electronic device with, say, voltages many times those for which it had last previously been used adjustment of the meter circuitry to optimum conditions for the new job would be indicated. In ordinary use of my probe, however, no meter change or circuity adjustment is required.

I preferably utilize in my probe a hollow cylinder together with a contact element constituting one terminal of the probe shiftable generally axially of the cylinder selectively to a plurality of positions relatively to the cylinder with a portion in contact with the inner surface of the cylinder and a portion projecting out of an end of the cylinder. A conductor constituting the other terminal of the probe preferably extends from the cylinder, and a meter is connected in electrical circuit with the terminals of the probe. The probe has different electrical connections through the contact element, the cylinder, the other terminal and the meter in the respective positions of the contact element relatively to the cylinder for testing differing electrical characteristics of electrical circuits extraneous to the probe circuit. The different electrical connections preferably include contacts through the wall of the cylinder engaged by the first mentioned portion of the contact element interiorly of the cylinder and electrically connected with conductors exteriorly of the cylinder. The hollow cylinder is preferably disposed within a casing and the conductors which are disposed exteriorly of the cylinder are preferably disposed interiorly of the casing.

I preferably provide a unit in the casing removable therefrom and replaceable by a different unit, the unit containing resistance means of selected magnitude. By this provision I am enabled to easily and quickly equip the probe with resistance means of a magnitude which is optimum for the work to be done. The unit may be in the form of a plug which may be applied to the casing to be electrically connected with the circuitry in the casing by suitable prongs or other electrical contact means in such manner that its removal and replacement by a similar unit may be accomplished without the use of tools.

In a preferred circuitry the probe may have different electrical connections through the contact element, the other terminal, at least one of the resistance elements and the meter in the respective positions to the casing. If, for example, there are three resistance elements the circuitry may be such that in one position of the contact element only one of the resistance elements is in circuit, in another position of the contact element two of the resistance elements are in circuit and in a third position of the contact element all three of the resistance elements are in circuit. By making the circuitry somewhat more sophisticated and providing for more operative positions of the contact element relatively to the casing different combinations of the resistance elements may be connected in circuit. If the resistance elements have different resistance values different total resistances are obtainable by connecting different combinations of the resistance elements in the probe circuit.

I find it desirable to equip the probe with means including a switch operable at the will of the operator to form a by-pass circuit of negligible resistance in parallel with all of the resistance elements. The practical effect of this is to eliminate all of the resistance elements from the probe circuit adapting the probe for measuring very low voltages or for measuring ohmage in a circuit impressed with a known voltage originating in the test equipment or for measuring milliamperes in a circuit impressed with a known voltage originating in the circuit of the electronic device being tested or for measuring alternating current voltage when suitably rectified.

In another form of probe I may provide means including a switch mounted on the casing operable at the will of the operator to reverse the polarity of the probe circuit. This has the advantage that each position of the contact element may be uitlized for measuring a characeristic of a circuit being tested in both direct and reverse polarity.

I prefer to urge the contact element to projected position by a compression coil spring of electroconductive material electrically connected into the probe circuit. This has this important advantage that there is a permanent electrical connection through the coil spring which is not affected by shifting of the contact element from one position to another.

Other details, objects and advantages of the invention will become apparent as the following description of certain present preferred embodiments thereof proceeds.

In the accompanying drawings I have shown certain present preferred embodiments of the invention in which FIGURE 1 is a longitudinal cross-section view through one form of probe for electrical testing made in accordance with my invention;

Figure 1:
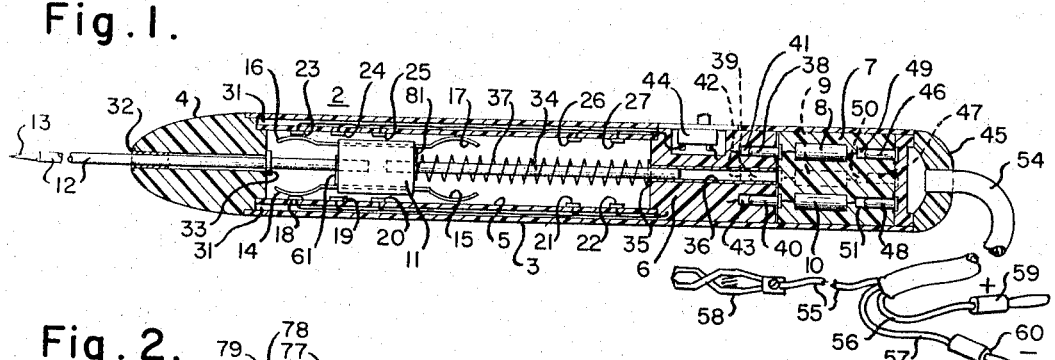
Figure 2:
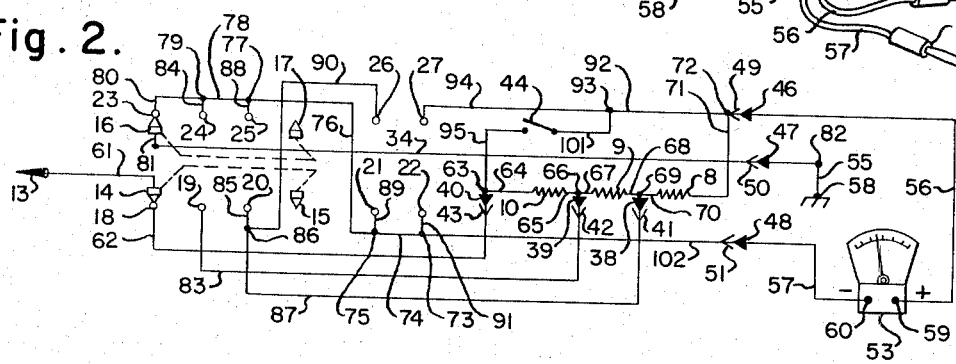
FIGURE 2 is a circuit diagram of the probe shown in FIGURE 1.
Figure 3:
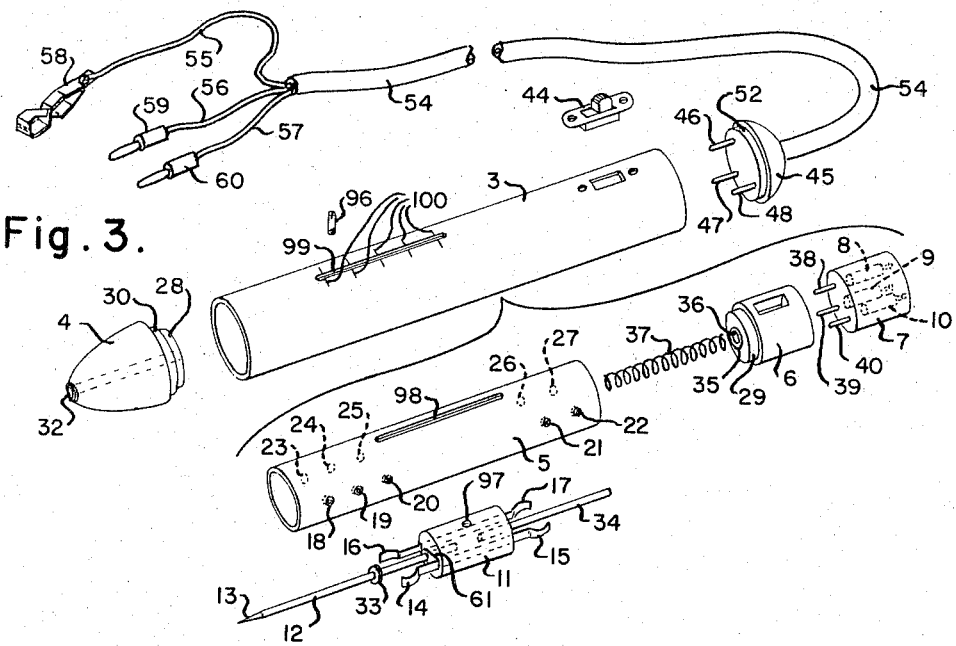
FIGURE 3 is an exploded view of the probe shown in FIGURE 1 illustrating the elements thereof.

Referring now more particularly to the drawings, and first to the form of probe shown in FIGURES 1, 2 and 3, the probe is designated generally by reference numeral 2. Its principal parts are shown in the exploded view constituting FIGURE 3. The casing of the probe is designated 3 and has a nose 4 fitted to its forward end. Within the casing 3 is a hollow cylinder 5 to which is fitted a head 6. A resistance unit 7 is plugged into the head 6. The resistance unit 7 contains a plurality of resistance elements. Three resistance elements 8, 9 and 10 are indicated. The resistance elements 8, 9 and 10 are preferably of different magnitudes.

A traveler 11 of insulating material is disposed in the hollow cylinder 5. Connected with and extending forwardly from the traveler 11 is a stem 12 of electroconductive material having at its end a point 13 constituting the positive terminal of the probe. The traveler has four spring contact fingers 14, 15, 16 and 17.

The spring contact finger 14 is adapted selectively to contact contact elements 18, 19 and 20 mounted on the hollow cylinder 5 and which are exposed to the spring contact finger 14 at the inside of the hollow cylinder 5 and extend through the wall of the hollow cylinder so that conductors may be connected therewith outside the hollow cylinder 5 and inside the casing 3.

The spring contact finger 15 is adapted selectively to contact contact elements 21 and 22 mounted on the hollow cylinder 5 and which are exposed to the spring contact finger 15 at the inside of the hollow cylinder 5 and extend through the wall of the hollow cylinder so that conductors may be connected therewith outside the hollow cylinder 5 and inside the casing 3.

The spring contact finger 16 is adapted selectively to contact contact elements 23, 24 and 25 mounted on the hollow cylinder 5 and which are exposed to the spring contact finger 16 at the inside of the hollow cylinder 5 and extend through the wall of the hollow cylinder so that conductors may be connected therewith outside the hollow cylinder 5 and inside the casing 3.

The spring contact finger 17 is adapted selectively to contact contact elements 26 and 27 mounted on the hollow cylinder 5 and which are exposed to the spring contact finger 17 in the inside of the hollow cylinder 5 and extend through the wall of the hollow cylinder so that conductors may be connected therewith outside the hollow cylinder 5 and inside the casing 3.

The spring contact fingers 14 and 15 are the terminal portions of a single electroconductive element of the traveler 11 and the spring contact fingers 16 and 17 are the terminal portions of another single electroconductive element of the traveler 11 as clearly shown in the drawings.

When the elements are assembled the hollow cylinder 5 is centered within the casing 3 so that an annular space 31 is provided between the outer surface of the hollow cylinder and the casing by a centering boss 28 on the nose 4 and a centering boss 29 on the head 6. The casing 3 fits to the nose 4 about a portion 30 of the nose and the head 6 fits snugly within the casing so that, as above mentioned, the hollow cylinder 5 is centered within the casing and the annular space 31 is provided between the casing and the hollow cylinder.

The stem 12 passes through a guide passage 32 in the nose 4 and has a stop collar 33 fixed to the stem to limit outward movement of the stem 12 and hence of the positive terminal 13, the positive terminal 13 being shown in its outermost or farthest projected position in FIGURE 1.

A rod 34 of electroconductive material is connected with and projects rearwardly from the traveler 11 and is guided in an electroconductive sleeve 35 in a bore 36 in the head 6. Thus the traveler 11 is guided for movement longitudinally of the hollow cylinder 5 so that the spring contact fingers may selectively contact the contact elements as above described. A compression coil spring 37 surrounds the rod 34 and bears at one end against the traveler 11 and at the other end against the head 6 and resiliently urges the traveler and hence the positive terminal 13 outwardly of casing 3 or toward the left viewing FIGURE 1. The parts are shown in normal position in FIGURE 1, i.e., the position they assume when the probe is not in use, with the spring 37 holding the traveler in its extreme left-hand position viewing that figure with the stop collar 33 in engagement with the nose 4.

The resistance unit 7 plugs into the head 6. The resistance unit 7 has three prongs 38, 39 and 40 which are received in sockets 41, 42 and 43 respectively in the head 6. Also mounted in the head 6 is a switch 44. The circuitry will be presently described.

When the traveler 11 has been disposed in the hollow cylinder 5 and the spring 37, the head 6 and the resistance unit 7 assembled thereto the assembly is inserted into the casing 3 and the nose 4 applied. A plug 45 having prongs 46, 47 and 48 is plugged into the resistance unit 7. The prongs 46, 47 and 48 are received in sockets 49, 50 and 51 respectively in the resistance unit 7. The plug 45 has a portion 52 which enters the end of the casing 3 whereby the plug is centered to the casing. The portion 52 of the plug fits tightly in the end of the casing maintaining the elements assembled. Additional fastening means may, if desired or found necessary, be applied to maintain the nose 4 and the plug 45 assembled to the casing 3.

The probe is electrically connected with a meter 53 shown in the drawings as a voltmeter of the "full scale" type, i.e., with the zero point of the scale at the extreme left-hand end of the scale so that the entire scale may be used to indicate a voltage range. For use of such a meter for testing a direct current circuit in an electronic device the polarity of the probe must correspond with that of the meter; otherwise the needle or pointer of the meter will tend to move to the left off of the scale. A plurality of series of indicia may be applied to the scale of the voltmeter for direct reading in each of a plurality of positions of the traveler in the casing as herein explained.

Extending from the plug 45 in a common sheath 54 are three conductors 55, 56 and 57 insulated from each other. The conductor 55 extends to a negative terminal 58 in the form of a ground clamp. The conductor 56 constitutes a positive lead and the conductor 57 constitutes a negative lead, such leads being provided with plugs 59 and 60 respectively through which they are plugged into the meter 53.

The circuitry of the probe shown in FIGURES 1, 2 and 3 will now be described. When the probe is to be used for testing an electrical circuit in an electrical or electronic device the ground clamp 58 is clamped to the frame of the electronic device, the electronic device itself being grounded to the frame so that a circuit may be closed through a desired part of the circuitry of the electronic device being tested by touching the positive terminal 13 of the probe to a predetermined point in the device. With the parts in the position shown in FIGURE 1 a circuit is closed from the positive terminal 13 through a conductor 61 to the spring contact finger 14 and thence to the contact element 18. The contact element 18 is connected by a conductor 62 with the socket 43, the prong 40 and a terminal 63 from which a conductor 64 extends to the resistance element 10. From the resistance element 10 a conductor 65 extends to a terminal 66 from which a conductor 67 extends to the resistance element 9. From the resistance element 9 a conductor 68 extends to a terminal 69 from which a conductor 70 extends to the resistance element 8. From the resistance element 8 a conductor 71 extends to a terminal 72 which is electrically connected with the socket 49 in which is disposed the prong 46 from which the conductor 56 extends to the positive terminal of the meter 53. From the negative terminal of the meter 53 the conductor 57 extends to the prong 48 in the socket 51 whence a conductor 102 extends to a terminal 73. From the terminal 73 a conductor 74 extends to a terminal 75. From the terminal 75 a conductor 76 extends to a terminal 77. From the terminal 77 a conductor 78 extends to a terminal 79. From the terminal 79 a conductor 80 extends to the contact element 23 with which the spring contact finger 16 is in contact. The spring contact finger 16 is in electrical contact with the rod 34 through a conductor 81. The rod 34 is as above described guided by a sleeve 35 of electroconductive material in electrical contact with the socket 50 in which is disposed the prong 47 electrically connected with a terminal 82 to which the conductor 55 extends, thus completing the circuit. The spring 37 is in continuous electrical contact with the conductor 81 and with the sleeve 35 so that the sliding connection between the rod 34 and the sleeve 35 is not solely relied upon to transmit current between the rod and the sleeve.

It will have been noted that with the parts in the position of FIGURE 1 as above described the three resistance elements 8, 9 and 10 are in series and all three are active in the probe circuit. If with the elements in the position shown in FIGURE 1 a reading in the upper reaches of the meter scale is obtained the probe is effectively used. If, however, a lower voltage is being tested so that the pointer of the meter does not move to the upper reaches of the meter scale reduction of the resistance in the probe circuit is indicated. This is accomplished by the operator, holding the casing 2 in his hand, pressing the casing toward the work. The positive terminal 13, being in engagement with the work, remains stationary. The casing advances toward the work, compressing the spring 37. When the casing has advanced to the point at which the spring contact finger 14 engages the contact element 19 a circuit is closed from the contact element 19 through a conductor 83, the socket 42, the prong 39, the terminal 66, the conductor 67, the resistance element 9, the conductor 68, the terminal 69, the conductor 70, the resistance element 8, the conductor 71, the terminal 72, the socket 49, the prong 46, the conductor 56, the meter 53, the conductor 57, the prong 48, the socket 51, the conductor 102, the terminal 73, the conductor 74, the terminal 75, the conductor 76, the terminal 77, the conductor 78, the terminal 79, a conductor 84, the contact element 24, the spring contact finger 16, the conductor 81, the rod 34, the sleeve 35, the socket 50, the prong 47, the terminal 82 and the conductor 55 to the ground clamp 58. In this setting only two of the three resistance elements, to wit, resistance elements 8 and 9, are active in the probe circuit.

If a still lower voltage is to be tested the operator presses the casing 3 farther toward the work, further compressing the spring 37, until the spring contact finger 14 contacts the contact element 20. Then a circuit is closed from the contact element 20 through a conductor 85, a terminal 86, a conductor 87, the socket 41, the prong 38, the terminal 69, the conductor 70, the resistance element 8, the conductor 71, the terminal 72, the socket 49, the prong 46, the conductor 56, the meter 53, the conductor 57, the prong 48, the socket 51, the conductor 102, the terminal 73, the conductor 74, the terminal 75, the conductor 76, the terminal 77, a conductor 88, the contact element 25, the spring contact finger 16, the conductor 81, the rod 34, the sleeve 35, the socket 50, the prong 47, the terminal 82 and the conductor 55 to the ground clamp 58. In this setting only one of the three resistance elements, to wit, the resistance element 8, is active in the probe circuit.

If in the testing operation a negative voltage is to be tested the operator moves the casing 3 farther toward the work until the spring contact finger 15 contacts the contact element 21. The effect of this is to reverse the polarity of the probe so that a positive reading can be obtained on the meter. With the spring contact finger 15 in contact with the contact element 21 a circuit is closed through a conductor 89, the terminal 75, the conductor 74, the terminal 73, the conductor 102, the socket 51, the prong 48, the conductor 57, the meter 53, the conductor 56, the prong 46, the socket 49, the terminal 72, the conductor 71, the resistance element 8, the conductor 70, the terminal 69, the prong 38, the socket 41, the conductor 87, the terminal 86, a conductor 90, the contact element 26, the spring contact finger 17, the conductor 81, the rod 34, the sleeve 35, the socket 50, the prong 47, the terminal 82 and the conductor 55 to the ground clamp 58. In this setting only the resistance element 8 is active in the probe circuit. Generally negative voltages encountered in testing will be of lesser magnitude than positive voltages so on testing negative voltages less resistance is required in the testing circuit.

If a negative voltage of still lower magnitude is to be tested the operator presses the casing 3 still further toward the work, additionally compressing the spring 37 until the spring contact finger 15 contacts the contact element 22. At that time a circuit is closed from the contact element 22 through a conductor 91, the terminal 73, the conductor 102, the socket 51, the prong 48, the conductor 57, the meter 53, the conductor 56, the prong 46, the socket 49, the terminal 72, a conductor 92, a terminal 93, a conductor 94, the contact element 27, the spring contact finger 17, the conductor 81, the rod 34, the sleeve 35, the socket 50, the prong 47, the terminal 82 and the conductor 55 to the ground clamp 58. In this setting none of the resistance elements 8, 9 and 10 is active in the probe circuit.

In the above described operations in the testing of positive voltages at least one of the resistance elements 8, 9 and 10 was always in circuit. In the first position of the traveler above described all three of the resistance elements were in circuit. In the second position two of the resistance element were in circuit. In the third position one of the resistance elements was in circuit. At times it may be necessary to test extremely low positive votlages when it will be desirable not to have any of the resistance elements in circuit. To accomplish this result the switch 44 is provided. If it is desired to test positive voltages with none of the resistance elements active in the probe circuit the probe is used in the first position, i.e., with the spring contact finger 14 in contact with the contact element 18, and the switch 44 is closed. A circuit is then closed from the contact element 18 through the conductor 62, the socket 43, the prong 40, the terminal 63, a conductor 95, the switch 44, a conductor 101, the terminal 93, the conductor 92, the terminal 72, the socket 49, the prong 46, the conductor 56, the meter 53, the conductor 57, the prong 48, the socket 51, the conductor 102, the terminal 73, the conductor 74, the terminal 75, the conductor 76, the terminal 77, the conductor 78, the terminal 79, the conductor 80, the contact element 23, the spring contact finger 16, the conductor 81, the rod 34, the sleeve 35, the socket 50, the prong 47, the terminal 82 and the conductor 55 to the ground clamp 58. Thus all three of the resistance elements 8, 9 and 10 are cut out of the probe circuit for the testing of positive voltages of low magnitude.

The various conductors and terminals above described and shown in the circuit diagram constituting FIGURE 2 are disposed within the probe, either in the annular space between the casing 3 and the hollow cylinder 5 or built into the head 6 or the resistance unit 7. It is not possible to show all the details of the circuitry in FIGURE 1 but those skilled in the art will have no difficulty understanding the circuitry and how it may be built into the probe from the above explanation coupled with the circuit diagram of FIGURE 2.

An indicator 96 in the form of a pin having its end threaded is screwed into a threaded bore 97 in the traveler 11 and extends through a slot 98 in the hollow cylinder 5 and a registering slot 99 in the casing 3. The casing 3 has indicia 100 adjacent the slot 99 so that the position of the traveler in the casing is indicated at all times by the indicator 96. By the position of the indicator 96 the operator can always ascertain whether the spring contact finger 14 is in contact with the contact element 18, the contact element 19 or the contact element 20 or the spring contact finger 15 is in contact with the contact element 21 or the contact element 22. The position of the indicator 96 may indicate a factor to apply to the meter scale or may indicate which of a plurality of meter scales is to be read. The indicator also prevents relative turning between the traveler 11 and the hollow cylinder 5 and the casing 3.

Figure 4:
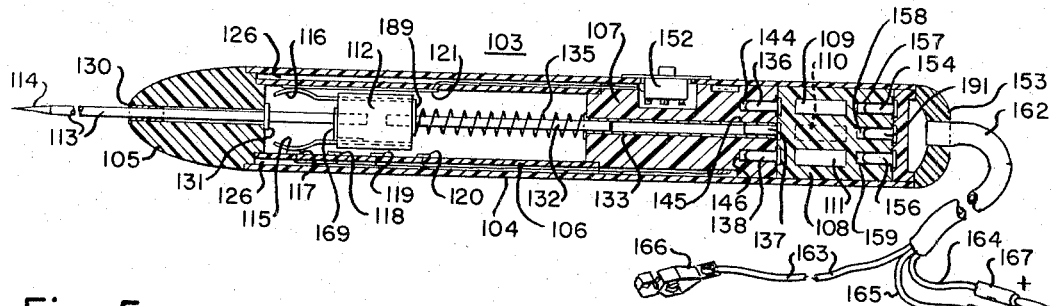
FIGURE 4 is a longitudinal cross-sectional view through another form of probe for electrical testing made in accordance with my invention.
Figure 5:
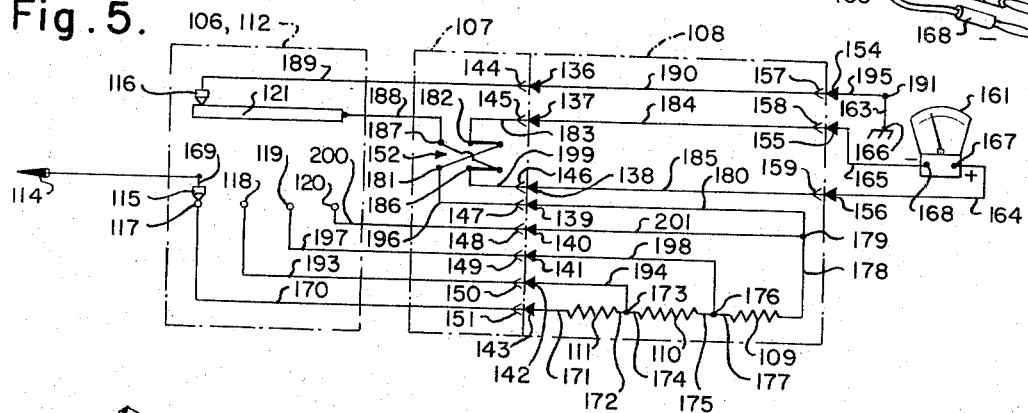
FIGURE 5 is a circuit diagram of the probe shown in FIGURE 4.
Figure 6:
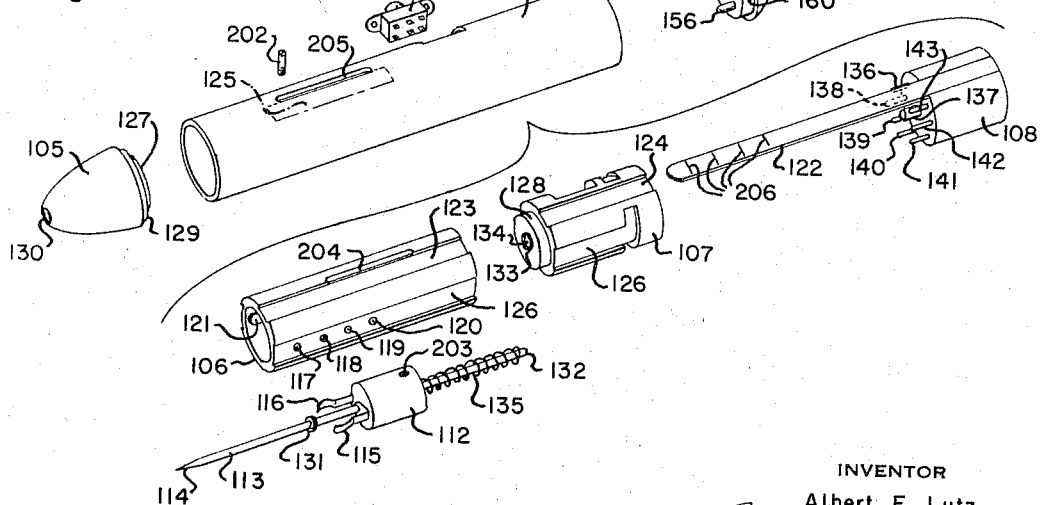
FIGURE 6 is an exploded view of the probe shown in FIGURE 4 illustrating the elements thereof.

Referring now to the form of probe shown in FIGURES 4, 5 and 6, the probe is designated generally by reference numeral 103. Its principal parts are shown in the exploded view constituting FIGURE 6. The casing of the probe is designated 104 and has a nose 105 fitted to its forward end. Within the casing 104 is a hollow cylinder 106 to which is fitted a head 107. A resistance unit 108 is plugged into the head 107. The resistance unit contains a plurality of resistance elements. Three resistance elements 109, 110 and 111 are indicated. The resistance elements 109, 110 and 111 are preferably of different magnitudes.

A traveler 112 of insulating material is disposed in the hollow cylinder 106. Connected with and extending forwardly from the traveler 112 is a stem 113 of electroconductive material having at its end a point 114 constituting the positive terminal of the probe. The traveler has two spring contact fingers 115 and 116. The spring contact finger 115 is adapted selectively to contact contact elements 117, 118, 119 and 120 mounted on the hollow cylinder 106 and which are exposed to the spring contact finger 115 at the inside of the hollow cylinder 106 and extend through the wall of the hollow cylinder so that conductors may be connected therewith outside the hollow cylinder 106 and inside the casing 104.

The spring contact finger 116 is adapted to contact at all times a continuous elongated contact element 121 mounted on the hollow cylinder 106 and which is exposed to the spring contact finger 116 at the inside of the hollow cylinder 106 and extends through the wall of the hollow cylinder 106 so that a conductor may be connected therewith outside the hollow cylinder 106 and inside the casing 104.

The resistance unit 108 has connected therewith so as in effect to form an integral part thereof an indicating finger 122. The resistance unit 108 is adapted to be replaced by similar resistance units but containing resistance elements of different magnitudes. This will affect the readings on the meter scale. The indicating finger 122 is to assist in reading the meter. It bears indicia 206 related to the resistance elements in the resistance unit 108 and may contain factors applicable to the meter scale or if the meter contains a plurality of scales an indication as to which scale is to be read.

The hollow cylinder 106 and the head 107 have aligned grooves 123 and 124 to receive the indicating finger 122 when the parts are assembled. The casing 104 is provided with a window or transparent portion 125 through which the indicia on the indicating finger 122 are adapted to be read.

When the elements are assembled the hollow cylinder 106 is centered within the casing 104 so that a space 126 is provided between the hollow cylinder and the casing to receiving conductors. In this form of the invention the space 126 is not completely annular because of the provision of the indicating finger 122 and the aligned grooves 123 and 124. In FIGURE 6 the space 126 for receiving conductors is indicated as being in the form of a channel in the hollow cylinder 106 extending to the head 107. The hollow cylinder 106 is maintained in coaxial relationship with the casing 104 by its fit within the casing and by centering bosses 127 on the nose 105 and 128 on the head 107. The casing 104 fits to the nose 105 about a portion 129 of the nose and the head 107 fits snugly within the casing.

The stem 113 passes through a guide passage 130 in the nose 105 and has a stop collar 131 fixed to the stem to limit outward movement of the stem 113 and hence of the positive terminal 114, the positive terminal 114 being shown in its outermost or farthest projected position in FIGURE 4.

A rod 132 of electroconductive material is connected with and projects rearwardly from the traveler 112 and is guided in an electroconductive sleeve 133 in a bore 134 in the head 107. Thus the traveler is guided for movement longitudinally of the hollow cylinder 106 so that the spring contact finger 115 may selectively contact the contact elements 117, 118, 119 and 120 as above described. A compression coil spring 135 surrounds the rod 132 and bears at one end against the traveler 112 and at the other end against the head 107 and resiliently urges the traveler and hence the positive terminal 114 outwardly of casing 104 or toward the left viewing FIGURE 4. The parts are shown in normal position in FIGURE 4, i.e., the position they assume when the probe is not in use, with the spring 135 holding the traveler in its extreme left-hand position viewing that figure with the stop collar 131 in engagement with the nose 105.

The resistance unit 108 plugs into the head 107. The resistance unit 108 has eight prongs 136, 137, 138, 139, 140, 141, 142 and 143 which are received in sockets 144, 145, 146, 147, 148, 149, 150 and 151 respectively in the head 107. Also mounted in the head 107 is a switch 152. The switch is a momentary spring-biased push button double-pull double-throw reversing switch whose function is to reverse the polarity of the probe when the switch is operated. As will be seen, there are four operative positions of the traveler 112, one with no resistance element in the probe circuit, a second with a single resistance element in the probe circuit, a third with two resistance elements in the probe circuit and a fourth with three resistance elements in the probe circuit. The reversing switch 152 can be operated in any position of the traveler 112 to reverse the polarity of the probe.

When the traveler 112 has been disposed in the hollow cylinder 106 and the spring 135, the head 107 and the resistance unit 108 assembled thereto the assembly is inserted into the casing 104 and the nose 105 applied. A plug 153 having prongs 154, 155 and 156 is plugged into the resistance unit 108. The prongs 154, 155 and 156 are received in sockets 157, 158 and 159 respectively in the resistance unit 108. The plug 153 has a portion 160 which enters the end of the casing 104 whereby the plug is centered to the casing. The portion 160 of the plug fits tightly in the end of the casing maintaining the elements assembled. Additional fastening means may, if desired or found necessary, be applied to maintain the nose 105 and the plug 153 assembled to the casing 104.

The probe is electrically connected with a meter 161 shown in the drawings as a voltmeter of the "full scale" type similar to the meter 53 of FIGURE 1. Extending from the plug 153 in a common sheath 162 are three conductors 163, 164 and 165 insulated from each other. The conductor 163 extends to a negative terminal 166 in the form of a ground clamp. The conductor 164 constitutes a positive lead and the conductor 165 constitutes a negative lead, such leads being provided with plugs 167 and 168 respectively through which they are plugged into the meter 161.

The circuitry of the probe shown in FIGURES 4, 5 and 6 will now be described. When the probe is to be used for testing an electrical circuit in an electrical or electronic device the ground clamp 166 is clamped to the frame of the electronic device, the electronic device itself being grounded to the frame so that a circuit may be closed through a desired part of the circuitry of the electronic device being tested by touching the positive terminal 114 of the probe to a predetermined point in the device. With the parts in the position shown in FIGURE 4 a circuit is closed from the positive terminal 114 to the spring contact finger 115 through a conductor 169 and thence to the contact element 117. The contact element 117 is connected through a conductor 170, the socket 151, the prong 143 and a conductor 171 to the resistance element 111. From the resistance element 111 a conductor 172 is connected with a terminal 173 from which leads a conductor 174 to the resistance element 110. From the resistance element 110 a conductor 175 is connected with a terminal 176 from which leads a conductor 177 to the resistance element 109. From the resistance element 109 a conductor 178 extends to a terminal 179. From the terminal 179 a conductor 180 is connected through the prong 139, the socket 147, and a conductor 196 to a switch terminal 181 of the switch 152. In the position in which the switch is shown in FIGURE 5 the switch terminal 181 is electrically connected with a switch terminal 182 which in turn is connected by a conductor 183 through the socket 145 and the prong 137 with a conductor 184. The conductor 184 is connected through the socket 158 and the prong 155 with the conductor 165 which extends to the meter 161. The conductor 164 extends from the meter 161 through the prong 156 and the socket 159 to a conductor 185 which is connected through the prong 138, the socket 146 and a conductor 199 with a switch terminal 186 of the switch 152. In the position in which the switch is shown in FIGURE 5 the switch terminal 186 is electrically connected with a switch terminal 187 which in turn is connected by a conductor 188 with the contact element 121. The spring contact finger 116 is always in contact with the contact element 121. A conductor 189 extends from the spring contact finger 116 to the rod 132 and the rod 132 is connected through the sleeve 133 (the rod 132 and sleeve 133 are not illustrated in FIGURE 5) and through the socket 144 and the prong 136 to a conductor 190 which in turn is connected through the socket 157 and the prong 154 and through a conductor 195 with a terminal 191. The terminal 191 is connected through a conductor 163 with the ground clamp 166, completing the circuit.

The manner of manipulation of the probe of FIGURES 4, 5 and 6 is generally the same as the manner of manipulation of the probe of FIGURES 1, 2 and 3. When the operator places the positive terminal 114 on a portion of the work and presses the casing 104 toward the work the casing advances and upon successive steps of advance of the casing the spring contact finger 115 successively contacts the contact elements 118, 119 and 120.

When the probe has been manipulated so that the spring contact finger 115 contacts the contact element 118 and with the switch 152 in the position in which it is shown in FIGURE 5 a circuit is closed from the contact element 118 through a conductor 193, the socket 150, the prong 142, a conductor 194, the terminal 173, the conductor 174, the resistance element 110, the conductor 175, the terminal 176, the conductor 177, the resistance element 109, the conductor 178, the terminal 179, the conductor 180, the prong 139, the socket 147, the conductor 196, the switch terminals 181 and 182, the conductor 183, the socket 145, the prong 137, the conductor 184, the socket 158, the prong 155, the conductor 165, the meter 161, the conductor 164, the prong 156, the socket 159, the conductor 185, the prong 138, the socket 146, the conductor 199, the switch terminals 186 and 187, the conductor 188, the contact element 121, the spring contact finger 116, the conductor 189, the rod 132, the sleeve 133, the socket 144, the prong 136, the conductor 190, the socket 157, the prong 154, the conductor 195, the terminal 191 and the conductor 163 to the ground clamp 166.

When the probe has been manipulated so that the spring contact 115 contacts the contact element 119 and with the switch 152 in the position in which it is shown in FIGURE 5 a circuit is closed from the contact element 119 thorugh a conductor 197, the socket 149, the prong 141, a conductor 198, the terminal 176, the conductor 177, the resistance element 109, the conductor 178, the terminal 179, the conductor 180, the prong 139, the socket 147, the conductor 196, the switch terminals 181 and 182, the conductor 183, the socket 145, the prong 137, the conductor 184, the socket 158, the prong 155, the conductor 165, the meter 161, the conductor 164, the prong 156, the socket 159, the conductor 185, the prong 138, the socket 146, the conductor 199, the switch terminals 186 and 187, the conductor 188, the contact element 121, the spring contact finger 116, the conductor 189, the rod 132, the sleeve 133, the socket 144, the prong 136, the conductor 190, the socket 157, the prong 154, the conductor 195, the terminal 191 and the conductor 163 to the ground clamp 166.

When the probe has been manipulated so that the spring contact finger 115 contacts the contact element 120 and with the switch 152 in the position in which it is shown in FIGURE 5 a circuit is closed from the contact element 120 through a conductor 200, the socket 148, the prong 140, a conductor 201, the terminal 179, the conductor 180, the prong 139, the socket 147, the conductor 196, the switch terminals 181 and 182, the conductor 183, the socket 145, the prong 137, the conductor 184, the socket 158, the prong 155, the conductor 165, the meter 161, the conductor 164, the prong 156, the socket 159, the conductor 185, the prong 138, the socket 146, the conductor 199, the switch terminals 186 and 187, the conductor 188, the contact element 121, the spring contact finger 116, the conductor 189, the rod 132, the sleeve 133, the socket 144, the prong 136, the conductor 190, the socket 157, the prong 154, the conductor 195, the terminal 191 and the conductor 163 to the ground clamp 166.

When the push button of the switch 152 is pressed the polarity of the probe is reversed. Instead of the switch terminal 181 being electrically connected to the switch terminal 182 it is electrically connected to the switch terminal 186 and instead of the switch terminal 187 being electrically connected to the switch terminal 186 it is electrically connected to the switch terminal 182. Otherwise the circuits may be traced in FIGURE 5 as has been done above for the respective positions of the traveler 112.

Thus the probe of FIGURES 4, 5 and 6 may be employed in each of the four positions of the traveler 112 to test positive voltages when the switch 152 is in the position shown in FIGURE 5 and to test negative voltages when the reversing switch is thrown to the opposite position by pressing the switch push button.

An indicator 202 in the form of a pin having its end threaded is screwed into a threaded bore 203 in the traveler 112 and extends through a slot 204 in the hollow cylinder 106 and a registering slot 205 in the casing 104. As mentioned above the indicating finger 122 bears indicia 206 visible through the window or transparent portion 125 of the casing 104 and the indicator 202 determines in each position of the traveler 112 which of the indicia 206 are to be read by the operator.

While I have shown and described certain present preferred embodiments of the invention it is to be distinctly understood that the invention is not limited thereto but may be otherwise variously embodied within the scope of the following claims.

I claim:

1. A probe for electrical testing comprising a hollow cylinder, a contact element constituting one terminal of the probe shiftable generally axially of the cylinder selectively to a plurality of operative positions relatively to the cylinder with a portion in contact with the inner surface of the cylinder and a portion projecting out of an end of the cylinder, a conductor constituting the other terminal of the probe extending from the cylinder and a meter in electrical circuit with said terminals, the probe having a plurality of electrical connections through the contact element, the cylinder, the other terminal and the meter, one such electrical connection for each of the plurality of operative positions of the contact element relatively to the cylinder, for testing differing electrical characteristics of electrical circuits extraneous to the probe circuit.

2. A probe for electrical testing comprising a hollow cylinder, a contact element constituting one terminal of the probe shiftable generally axially of the cylinder selectively to a plurality of positions relatively to the cylinder with a portion in contact with the inner surface of the cylinder and a portion projecting out of an end of the cylinder, a conductor constituting the other terminal of the probe extending from the cylinder and a meter in electrical circuit with said terminals, the probe having a plurality of electrical connections through the contact element, the cylinder, the other terminal and the meter in the respective positions of the contact element relatively to the cylinder for testing differing electrical characteristics of electrical circuits extraneous to the probe circuit, said different electrical connections including contacts through the wall of the cylinder engaged by the first mentioned portion of the contact element interiorly of the cylinder and electrically connected with conductors exteriorly of the cylinder.

3. A probe for electrical testing comprising a casing, a hollow cylinder in the casing, a contact element constituting one terminal of the probe shiftable generally axially of the cylinder selectively to a plurality of positions relatively to the cylinder and casing with a portion in contact with the inner surface of the cylinder and a portion projecting out of an end of the cylinder and out of the casing, a conductor constituting the other terminal of the probe extending from the casing and a meter in electrical circuit with said terminals, the probe having a plurality of electrical connections through the contact element, the cylinder, the other terminal and the meter in the respective positions of the contact element relatively to the cylinder and casing for testing differing electrical characteristics of electrical circuits extraneous to the probe circuit, said different electrical connections including contacts through the wall of the cylinder engaged by the first mentioned portion of the contact element interiorly of the cylinder and electrically connected with conductors exteriorly of the cylinder and interiorly of the casing.

4. A probe for electrical testing comprising a casing, a contact element constituting one terminal of the probe mounted in and projecting from the casing, a conductor constituting the other terminal of the probe extending from the casing, a plurality of resistance elements of different magnitudes in the casing, and a meter, the contact element being shiftable selectively to a plurality of positions relatively to the casing, the probe having a plurality of electrical connections through the contact element, the other terminal, at least one of the resistance elements and the meter in the respective positions of the contact element relatively to the casing for testing differing electrical characteristics of electrical circuits extraneous to the probe circuit.

5. A probe for electrical testing comprising a casing, a contact element constituting one terminal of the probe mounted in and projecting from the casing, a conductor constituting the other terminal of the probe extending from the casing, a plurality of resistance elements of different magnitudes in the casing, a meter, the contact element being shiftable selectively to a plurality of positions relatively to the casing, the probe having a plurality of electrical connections through the contact element, the other terminal, at least one of the resistance elements and the meter in the respective positions of the contact element realtively to the casing for testing differing electrical characteristics of electrical circuits extraneous to the probe circuit and means including a switch operable at the will of the operator to form a by-pass circuit of negligible resistance in parallel with all of the resistance elements.

6. A probe for electrical testing comprising a casing, a contact element constituting one terminal of the probe mounted in and projecting from the casing, a conductor constituting the other terminal of the probe extending from the casing, a meter in electrical circuit with said terminals and a compression coil spring urging the contact element to projected position, the contact element being shiftable inwardly of the casing to selected positions relatively thereto by holding the casing with the contact element in contact with an element of an electrical circuit being tested and pressing the casing toward said element of the electrical circuit being tested causing the casing to advance over the contact element against the action of the spring while the contact element remains substantially stationary, the probe having a plurality of electrical connections through the contact element, the spring acting as a conductor, the other terminal and the meter in the respective positions of the contact element relatively to the casing for testing differing electrical characteristics of electrical circuits extraneous to the probe circuit.

References Cited by the Examiner

UNITED STATES PATENTS

| | | | |
|---|---|---|---|
| 1,606,063 | 11/1926 | Edwards | 324—149 X |
| 2,508,956 | 5/1950 | Litwin | 324—72.5 X |
| 2,552,981 | 5/1951 | Lamb | 324—72.5 X |
| 2,641,630 | 6/1953 | Goldberger | 324—72.5 |
| 2,829,336 | 4/1958 | Heyer | 324—72.5 X |
| 2,849,681 | 8/1958 | Belart | 324—149 |
| 2,912,647 | 11/1959 | Krystek | 324—72.5 |

FOREIGN PATENTS 1,114,585  10/1961  Germany.

WALTER L. CARLSON, Primary Examiner.

R. V. ROLINEC, Assistant Examiner.